United States Patent [19]

Sweet

[11] 4,182,593
[45] Jan. 8, 1980

[54] BALE LOADING AND HANDLING DEVICE

[76] Inventor: Walter A. Sweet, Rte. #1, Iantha, Mo. 64753

[21] Appl. No.: 880,181

[22] Filed: Feb. 22, 1978

[51] Int. Cl.$^2$ ............................................... B65G 47/90
[52] U.S. Cl. .................................... 414/732; 294/88; 294/106; 414/740; 414/743; 414/920
[58] Field of Search .......... 214/1 BD, 147 G, 147 R, 214/147 T, 140, 148, 78, 147 A, 147 S, 3.1 HA, 1 HH; 294/88, 106; 414/731, 733, 732, 738, 739, 740–743, 920

[56] References Cited

U.S. PATENT DOCUMENTS

| 3,052,366 | 9/1962 | Duncan | 214/147 G |
| 3,152,706 | 10/1964 | Conrad | 214/147 |
| 3,929,366 | 12/1975 | Keverline | 294/88 |
| 3,995,761 | 12/1976 | Hurlburt | 214/140 X |

FOREIGN PATENT DOCUMENTS

| 568293 | 10/1957 | Italy | 214/147 R |
| 211640 | 8/1966 | Sweden | 214/147 G |
| 318382 | 12/1969 | Sweden | 214/147 G |

Primary Examiner—Frank E. Werner
Attorney, Agent, or Firm—Thomas M. Scofield

[57] ABSTRACT

Improvements in large bale handlers and loaders which are tractor mounted and include (1) a frame pivotably mounted on a tractor; (2) lifting device operative to elevate the frame in pivotable movement around its connection to the tractor and also lower it; and (3) a grasping element operative to open and close to seize and release the bale.

6 Claims, 5 Drawing Figures

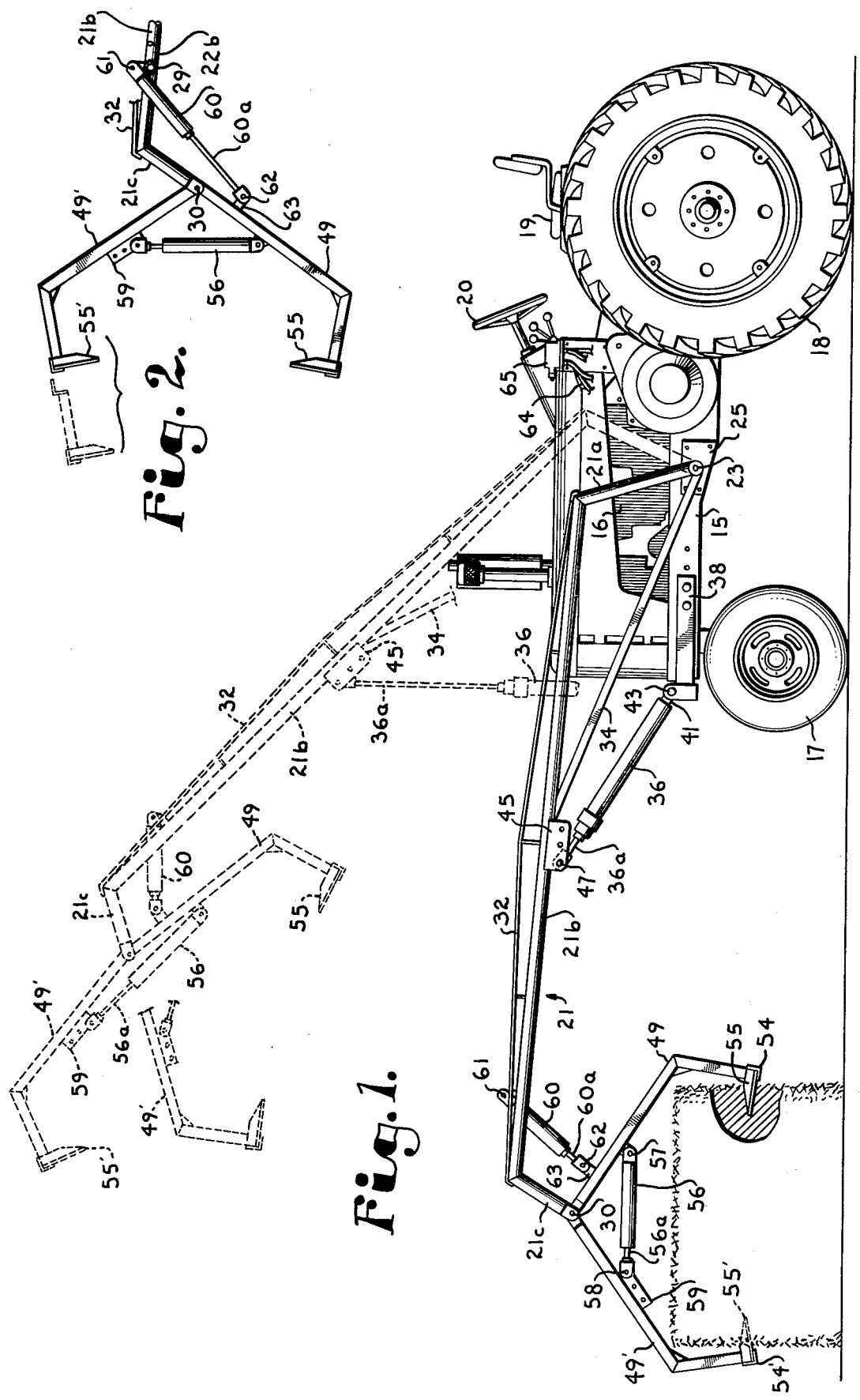

BALE LOADING AND HANDLING DEVICE

BACKGROUND OF THE INVENTION

Bale handlers and loaders are well known to the farm equipment art. A number of these are listed in the prior art section set forth herebelow. However, these well known and conventional handling and loading constructions are inadequate for use with the new large bales. Typically, the latter measure from 4 feet by 4 feet up to 5½ by 5½ feet, such weighing from 1,000 to 1,500 pounds.

In order for a bale handler and loader to adequately work with bales of this size and weight, the device must be able to load the large bales on trucks, stack them outside or inside of barns (from ground level) and also, preferably, stack them sitting on end or laying on their side. It is most desirable that the bale handling be performed from the front of the tractor in order that the operator will have a clear vision of the work operation in progress at all stages. Yet further, the bale loading and handling device should be working away from (clear of) the seat and position of the tractor operator because of the magnitude of the work effort, as well as the weights being handled.

In addition, such a loader should be able to handle both hard and soft bales adequately, as well as being adjustable from the larger size of the larger bales to the relatively smaller size of the smaller bales.

BRIEF DESCRIPTION OF THE INVENTION

Basically, the subject device comprises an elongate, rigid C-shape shaped frame made up of two parallel members, each one pivoted at one end approximately centrally of the tractor frame on each side thereof. At the front end of the tractor there is provided a pair of hydraulic cylinders pivotally mounted on the tractor frame at their lower and rearward ends, these cylinders also pivotally mounted approximately centrally of the C-frame on each side of the tractor with their opposite ends, specifically, at the ends of the piston rods. Bracing beams are provided extending from the rear C-frame pivot up to approximately centrally of the C-frame, as well as truss structure along the top of the elongate beam of the C-frame. Mounted on the forward, free ends of the frame members (which are also cross- or inter-connected along the length thereof for mutual bracing and strength) are a pair of J configuration jaws operated (to move them together or apart) by an hydraulic cylinder therebetween. There additionally is provided a tilt hydraulic cylinder for the jaw frame at the free end of the C-frame. Extensions may be provided for the jaw members to handle soft or extra large bales.

THE PRIOR ART

Applicant is aware of the following patents directed to the basic bale loading and handling construction including (1) a frame structure mounted on a tractor; (2) lift means operative to elevate and lower the frame around its tractor connection or connections; and (3) a grasping element usually comprising two jaws typically driven by an hydraulic cylinder to open and close to seize and release a bale or work object.

Shattuck, U.S. Pat. No. 2,605,919, issued Aug. 5, 1952, for "Hydraulic Hay Fork And Boom";

Squires et al, U.S. Pat. No. 2,696,926, issued Dec. 14, 1954, for "Hydraulic Hay Fork";

Miller, U.S. Pat. No. 2,883,230, issued Apr. 21, 1959, for "Hydraulic Grapple Loader";

Nelson, U.S. Pat. No. 2,954,886 "Bale Loader Attachment For Vehicles," issued Oct. 4, 1960;

Wills, U.S. Pat. No. 2,991,891 "Tractor Mounted Loading Attachment," issued July 11, 1961;

Duncan, U.S. Pat. No. 3,052,366, issued Sept. 4, 1962, for "Power Operated Bale Pilers"; and Behrens, U.S. Pat. No. 3,073,645 "Loading Device," issued Jan. 15, 1963.

OBJECTS OF THE INVENTION

A first object of the invention is to provide an improved bale handling and loader construction which operates to load and handle, with great ease, facility and convenience, large bales, including those within the size range of 4 by 4 feet, 5½ by 5½ feet weighing from 1,000 to 1,500 pounds.

Another object of the invention is to provide an improved large bale loading and handling construction which effectively permits loading the large bales on trucks, stacking them outside of or inside of barns (from the ground level) and further permits stacking of such large bales sitting on their ends or laying on their sides.

Another object of the invention is to provide improvements in the grasping elements of the bale loading and handling mechanisms, whereby to effectively grasp and handle the different bale sizes from 4 to 5½ feet and, as well, load and handle soft as well as hard bales.

Another object of the invention is to provide improved large bale loading and handling devices, these improvements provided within the elements of (1) the frame for mounting the bale loading and handling device on a tractor, (2) the lift means operative to elevate the frame around its tractor connection, as well as load it and (3) the grasping element comprising jaws operative to open and close to seize and release the bale.

Yet another object of the invention is to provide effective, powerful, simple and rugged large bale handling and loading means, which means are so mounted on the tractor frame and operated with respect to the driver as to provide maximum safety and clearance of the entire mechanism with respect to the operator's seat and position for safety's sake.

Yet another object of the invention is to provide such improved means and apparatus for loading and handling large bales wherein the entire mechanism, including frame, lift means and grasping elements are all mounted forwardly of the operator so that all elements of the apparatus may be observed by the operator when engaged in the operation of loading and/or handling large bales.

Another object of the invention is to provide a frame carrying structure which cooperates with a grasping element structure for loading and handling large bales wherein the grasping elements, when closed, may be positioned in essentially horizontal relationship both at lowermost and uppermost elevation of the frame with respect to its tractor mounting.

Yet another object of the invention is to provide such a large bale handler and loader which is not only sturdy and durable in construction, efficient in operation and relatively simple and inexpensive to manufacture, but which is also readily mountable on and detachable from a tractor carrier.

Still another object of the invention is to provide an improved large bale handler and loader which, for a minimum size and array of apparatus or structure and a minimum obstruction of tractor use and operation, can load, unload, carry, grapple and discharge a bale of relatively great size and weight, all at every level of frame elevation.

Other and further objects of the invention will appear in the course of the following description thereof.

DESCRIPTION OF THE DRAWINGS

In the drawings, which form a part of the instant specification and are to be read in conjunction therewith, embodiments of the invention are shown and, in the various views, like numerals are employed to indicate like parts.

FIG. 1 is a side view of the subject improved bale loading and handling device mounted on a tractor, the full line showing illustrating the frame in near horizontal or level position for seizing or grasping a large bale before elevation thereof, the dotted line showing illustrating the lift frame at full elevation with the grasping jaws fully open.

FIG. 2 is a detail of the grasping jaws of the structure of FIG. 1 with the piston of the tilt cylinder at the forward end of the C-frame fully extended. The dotted line showing is the addition of an additional grasping element (also see FIG. 5) for handling extra large and/or extra soft bales.

DESCRIPTION

Figure 3:
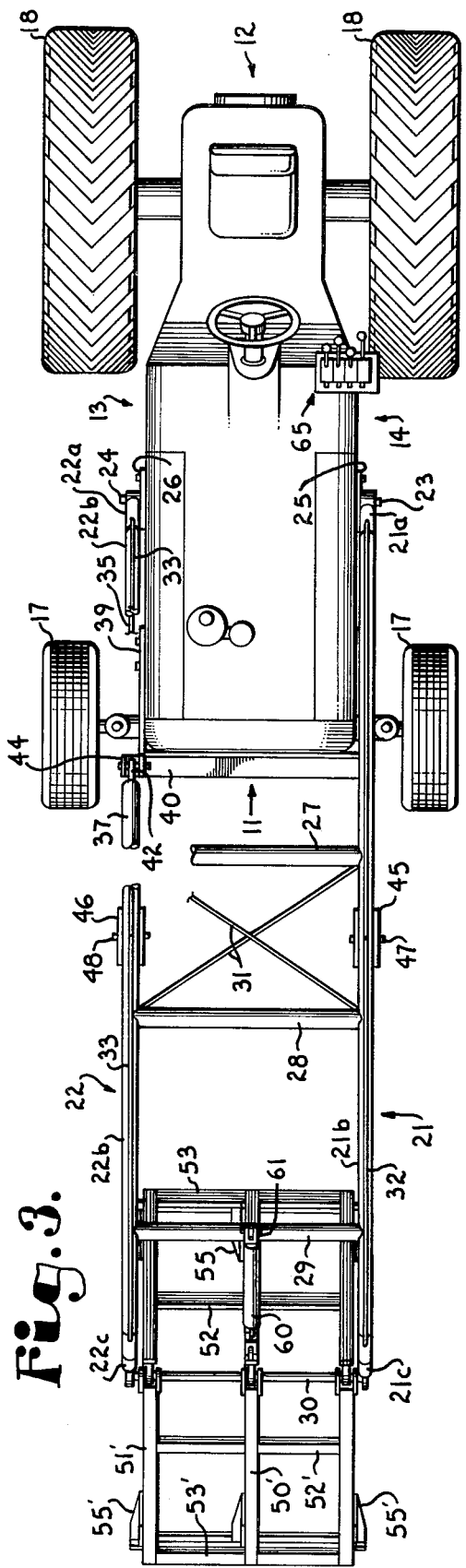
FIG. 3 is a vertical plan of the subject device seen in the full line position of FIG. 1 with parts cut away to better illustrate the elements of the device and their relationship to one another.

The subject improvement may be adapted to almost any kind of tractor, but is shown here and is particularly used and useful with a conventional farm tractor, such schematically shown and illustrated. The illustrated tractor has a front end 11, a rear end 12 (see FIG. 3 plan view) and sides 13 and 14. The basic structural frame of the tractor is best seen at 15, in the side view of FIG. 1. It carries a conventional power plant 16 and suitable structurals, front and rear, mounting front wheels 17 and rear wheels 18, as well as an operator's seat 19, steering means 20 and the like. All of this is conventional and will not be described in detail. The bale handling improvement to be described is removably mounted on and carried by the sides and front end of the tractor frame.

Basically, the improvement comprises bale loading and handling means for use with a conventional tractor having a tractor frame with front and rear ends and sides thereto, front and rear sets of tractor wheels carrying the frame and a power source on the frame for driving the tractor.

First, there is provided a lift frame which is pivotally mounted at one (the rear) end on the sides of the tractor structural frame, with the front, free end thereof extending forwardly of the front end of the tractor and tractor frame. This lift frame includes two parallel, elongate, C-shaped members in side elevation, generally designated 21 and 22. These C-shaped members 21 and 22 have rear C legs (21a and 22a) pivotally mounted at their lower ends by stub shafts 23 and 24 onto the sides of the tractor base frame. Plates 25 and 26 may be bolted or welded to the sides of the tractor base frame. They carry shafts 23 and 24, respectively, to mount the ends of C legs 21a and 22a pivotally at the ends thereof.

Each of the C-shaped members 21 and 22 have elongate, forwardly extending beams 21b and 22b fixed to the upper forward ends of legs 21a and 22a at their rearmost ends. Two preferably shortened front legs 21c and 22c are fixed to the forward ends of beams 21b and 22b. A plurality of transverse brace members 27, 28 and 29 are provided along the length of C-members 21 and 22, on beams 21b and 22b all rigidly, interconnecting the C-members 21 and 22 to one another to make a rigid frame and spacing them apart in parallel relationship. Shaft 30 at the ends of legs 21 and 22 mounts bale grasping elements as will be described. Cross bracing may be provided as at 31 as desired between the members 21 and 22 and transverse members 27 and 28, etc. Additionally, truss support structure as seen at 32 (on member 21) and 33 (on member 22) may additionally be provided for extra structural strength and rigidity. Yet further, braces 34 and 35 may be provided interconnecting the ends of rear C legs 21a and 22a with C beams 21b and 22b or cross member 27.

Transverse rod or shaft 30, at the free ends of C legs 21c and 22c, operates to pivotally mount the bale engaging and releasing jaws (to be described), while transverse member 29 mounts a hydraulic cylinder for tilting of the jaw assembly, as will be described. Typically, the height of legs 21a and 22a is not substantially greater than the height of the tractor body (see FIG. 1). If this is the case, then the transverse brace members 27-29, inclusive must be positioned forwardly of the front end of the tractor for clearance purposes when the lift frame is in the lower full line position of FIG. 1.

Hydraulic means are provided pivotally connected to the front end of the tractor frame and the lift frame intermediate the ends of the latter to pivotally lift and lower the entire lift frame around the pivotal mountings 23 and 24 thereof on the tractor frame. Such means optimally comprise a pair of hydraulic cylinder 36 and 37. Beams 38 and 39 are removably bolted to the sides of the tractor frame. L section strap 40 is removably bolted to the front end of the tractor frame. The upturned side edges of strap 40 and the front ends of beams 38 and 39 carry shafts or pins 43 and 44. The latter pivotally mount the lower ends of cylinders 36 and 37. The piston rods 36a and 37a of cylinders 36 and 37 are adjustably and pivotably connected at their free ends to paired plates or sets of plates 45 and 46 rigidly welded or otherwise fixed to C-member legs 21b and 21c. Because of the pivotal mounting of the hydraulic cylinders and their piston rods on the front end of the tractor frame and the beams 21b and 22b, extending the piston rods (see dotted line showing of FIG. 1) raises the lift frame around its rear pivotal mounting on the tractor frame and moves the cylinders 36 and 37 from the angled position seen in full lines of FIG. 1 to the dotted line position of FIG. 1.

Beams 38 and 39 and strap 40 may alternatively be box beams engaging one another for greater strength with shaft or pin carrying ears provided adjacent the ends of the beam replacing strap 40.

By adjusting the beams 38 and 39 forwardly or rearwardly in their connection on the tractor frame, as well as the piston rod connections to plates 45 and 46, the highest position of the cylinders and their rods may be an overcenter relationship from that seen in dotted lines.

A single hydraulic cylinder may be employed centrally mounted of the front end of the tractor frame connected to one of the cross members 27 or 28 if desired. The paired cylinder mounting as shown, one under each C-member, is preferred.

Pivotally mounted on transverse rod or shaft 30, at the outboard or forward free ends of free legs 21c and 22c are the bale grasping and manipulating means or jaws. Such jaws preferably comprise a pair of opposed frames, each of substantial J configuration in side view. Each J frame preferably comprises at least three J configuration arms rigidly connected to one another at intervals along the length thereof and pivotally mounted on their upper ends on shaft 30. The J frame construction is best seen in detail in FIG. 5.

The inboard or rearmost J frame is made up of a plurality of J configuration members 49-51, inclusive connected to one another by transverse structurals or beams 52 and 53 intermediate their length and L section beam 54 at their lowermost ends. Teeth 55 are secured to the beam 54 for bale engaging purposes, particularly illustrated in FIG. 1.

The forward or outboardmost J frame is made up of a set of like described members which will not here be redescribed, such being numbered the same in like parts, but primed.

An hydraulic cylinder 56 is pivotally mounted at its rearward end by shaft 57 on a plate fixed to the upper portion of J leg 50, the piston rod 56a of cylinder 56 being adjustably yet pivotally attached by pin 58 to plate 59 secured to the inner and lower face of J leg 50'. The purpose of cylinder 56 is to open and close the J frames with respect to one another from the full line position of FIG. 1, for example, to the extended open position of FIG. 1 in dotted lines.

Yet another hydraulic cylinder 60 is pivotally fixed at its rearward end by pin 61 to transverse beam 29. Piston rod 60a of this cylinder is pivotally attached by pin 62 at the free end thereof to plate or lug 63 on the rear side of beam 50. The purpose of this hydraulic cylinder 60 is to pivot the entire J frame bale grasping and manipulating apparatus around shaft or rod 30 in the manner seen in FIG. 2. This pivoting, as is the case with the opening and closing of the J frame jaws with cylinder 56, may be carried out at any height or level of inclination or lifting of the lift frame itself. Said otherwise, the bale grasping jaw frame assembly may be pivoted forwardly or rearwardly by cylinders 60 when the lift frame is lowered or raised. Yet further, the bale grasping jaws may be opened or closed when the lift frame is lowered or raised and, further, when the bale grasping jaws are retracted or extended (in the positions of FIGS. 1 or 2).

Figure 5:
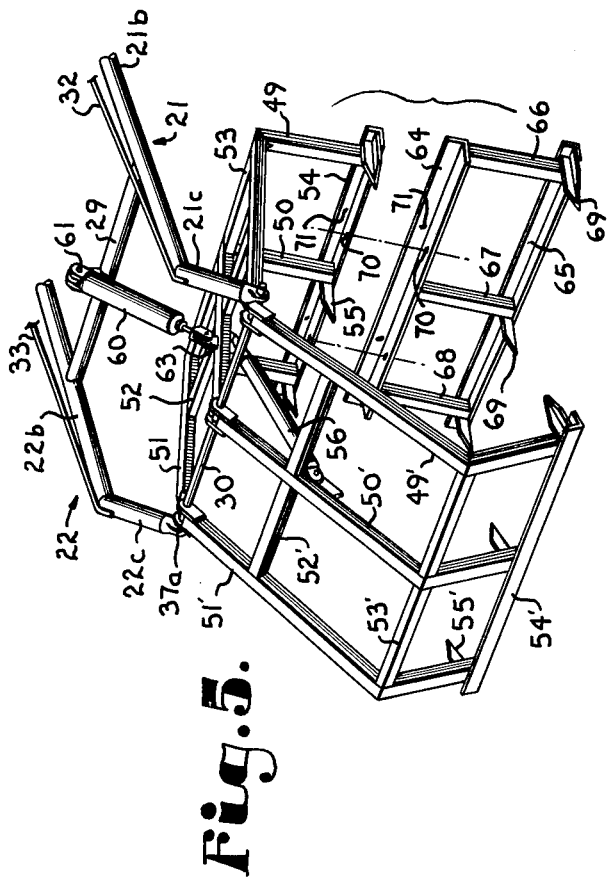
FIG. 5 is a three-quarter perspective view from above of the end of the frame showing the grasping elements mounted thereon, the hydraulic cylinders on the grasping element and frame end in the retracted position of FIG. 1, there also being shown (in exploded view) an optional addable grasping element for use with an extra large or extra soft bale.
Figure 4:
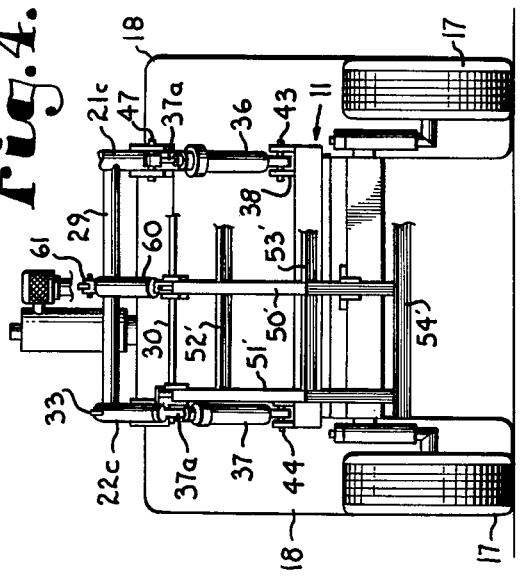
FIG. 4 is a front elevation of the device of the full line showings of FIGS. 1 and 3 with parts cut away to better illustrate the structure.

For use with very large or very loose bales, or both, auxillary J frame extensions may be employed as seen in FIGS. 2 and 5. Such an auxillary extension frame preferably is made up of a pair of L section frames 64 and 65 connected one to the other by beams 66-68, inclusive, with members 65 having teeth 69 fixed thereto. By providing matching holes 70 and 71 (sets of matching holes 70 and 71) in the L section members 54 and 64, removable securement of the extensions to the basic J frames may be provided. Such extensions are also employed paired on the opposing J leg frames. Frame 64 may be T section as well as L section. Teeth 55, 55', 69, etc. may be on either side of beams 50, 50' and 67 or extensions of the base portions thereof.

OPERATION

In operation of the device, and installation thereof on a conventional tractor frame, first plates 25 and 26 are bolted or welded to the tractor frame, the former via holes provided or drilled therewithin. Next the rear cylinder mounting involving straps 38 and 39 and beam 40 is secured to the tractor frame by welding same thereto or bolting through holes already present or provided. The lift frame is then secured to shafts 23 and 24 in pivotal fashion and the hydraulic cylinders 36 pivotally connected to the shafts 43 and 44 and pins 47 and 48. The bale engaging jaw frames may then be mounted on shaft 30 (or previously mounted thereon) and the hydraulic cylinders 56 as well as 60 connected for operation in the manner described.

With the frame assembled on the tractor and suitable hydraulic tube connections (not shown except at their control ends at 64 in FIG. 1) all made to a conventional hydraulic control system 65, the device is ready for use and operation.

The typical bale engaging position is seen in full lines in FIG. 1 with the hydraulic cylinders 36 and 37 having their piston rods fully retracted and cylinder 60 having its piston rod fully retracted. The bale engagement is typically made with the piston rod 56a of piston 56 fully or substantially retracted. Activation of cylinders 36 and 37 to extend rods 36a and 37a lift the bale from the ground surface. The bale may be transported at any desired level and lifted to the full extension of the rods from the cylinders. In carrying or placing the bale, the piston rod 60a of cylinder 60 may be extended as seen in FIG. 2.

Thus, with the baler frame structure as seen, its connection to the tractor, its articulation in its elements and the drive means connected as shown to its various elements (the hydraulic cylinders), large belts of the known types may be well and adequately handled in such a manner that retains their integrity.

Optimum dimensions for working with bales of the size and dimensions described, without limitation, may be as follows. The length of legs 21a and 22a 33¾ inches. The length of beams 21b and 22b 12 feet. The length of forward legs 21c and 22c 17 inches. The distance between the ends of teeth 55 and 55' in the position of FIG. 1 approximately 37 inches. The length of support beams 34 and 35 84 inches. Hydraulic cylinders 36 and 37 may be 4 foot cylinders with 83 inch expansions. The open distance between the teeth ends 55 and 55' approximately 63 inches. The length of the upper portions of J legs 49 and 49' from connection to rod 30 38 inches. The length of the lower J leg portions 18 inches. The length of the J frame extensions 14 inches.

The subject device will serve to load 4 to 5 large bales on a truck. It also will enable a storing of such in two bale high stacks. It will handle round or square bales. Height adjustment for extension may be made at plates 45 and 46. The C-shape (facing downwardly) beams 21, 22 give height for grasping of the large bales, permit the intermediate hydraulic cylinder connection at a feasible point on the tractor frame and further permit the pivot of the jaws or bale engaging frames downwardly when the lift frame is raised. This device has sufficient height clearance for not only picking stacked bales from a stack or bales from a truck, but also to permit disengagement of the device with the bales once they have been loaded or stacked.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Bale loading and handling means for use with a conventional tractor having a tractor frame with a front and a rear end and sides thereto, front and rear sets of tractor wheels carrying said frame and a power source on said frame for driving the tractor, comprising, in combination:

a pair of elongate, C-shaped members in side elevation, with the C opening downwardly, positioned one on each side of said tractor frame, each said member pivotally mounted at one rear end thereof on one side of the lower portion of said tractor frame intermediate the front and rear ends of the tractor frame, the other ends of the C members, as well as the lengths thereof, extending forwardly of said pivotal mounting thereof, each individual C-member made up of a normally downwardly extending rear leg, a normally substantially horizontally oriented center leg and a normally downwardly extending front leg, a plurality of transverse connecting members rigidly interconnecting the legs of said C members along the length thereof, whereby to interlock same into a rigid lift frame pivotable upwardly and downwardly around said rear end mountings, hydraulic cylinder means pivotally connected at one lower end thereof to the front end of said tractor frame and at the other upper end thereof to the lift frame intermediate the ends thereof for lifting and lowering the lift frame around the C member rear leg mountings thereof on the tractor frame, and bale grasping, releasing and tilting means pivotally mounted on said lift frame at the free ends of said C members thereof, a pair of opposed frames each of substantial J configuration in side view pivotably mounted at their upper ends from the free ends of the forward legs of the lift frame with the J frames opening inwardly with respect to one another, first hydraulic cylinder means interconnecting the J frames intermediate the ends thereof to form an assembly therewith and to move the frames toward and away from one another to grasp and release bales, and second hydraulic cylinder means connecting the J frame next to the tractor with the lift frame adjacent the forward free end thereof to tilt the J frame assembly with respect to the lift frame, each J frame comprising three J arms rigidly connected to one another and pivotally mounted on their upper ends on a beam connecting the outer ends of the forward legs of the C members making up the lift frame, the first hydraulic means interconnecting the center J members of each J frame and the second hydraulic cylinder means connected to the center one of the three J members of the J frame next to the tractor and also to a transverse member interconnecting the C members of the lift frame adjacent the free ends thereof.

2. A device as in claim 1 including an additional, auxillary J frame removeably attachable to each primary J frame at the end thereof to serve as an extension thereof, each secondary J frame itself comprising three J arms rigidly connected to one another at their upper and lower ends.

3. Bale loading and handling means for use with a conventional tractor having a tractor frame with a front and a rear end and sides thereto, front and rear sets of tractor wheels carrying said frame and a power source on said frame for driving the tractor, comprising, in combination:

a pair of elongate, C-shaped members in side elevation, with the C opening downwardly, positioned one on each side of said tractor frame, each said member pivotally mounted at one rear end thereof on one side of the lower portion of said tractor frame intermediate the front and rear ends of the tractor frame, the other ends of the C members, as well as the lengths thereof, extending forwardly of said pivotal mounting thereof, each individual C-member made up of a normally downwardly extending rear leg, a normally substantially horizontally oriented center leg and a normally downwardly extending front leg, the legs of the C members at the rearward and forward ends of the C frame each forming an obtuse angle with the center legs of the C members, whereby the rearward legs angle rearwardly and the forward legs angle forwardly from their connections to the intermediate C member legs, thereby to lengthen the extension of the overall C members with respect to their pivotal mounting on the tractor frame, the centers of the center legs of said C members positioned substantially forwardly of the front end of the tractor when the said C members are positioned with the center legs thereof substantially horizontal, the front legs of the C members at the forward free ends thereof being shorter in length than the rear legs thereof which are pivotally connected to the tractor frame, a plurality of transverse connecting members rigidly interconnecting the legs of said C members along the lengths thereof, whereby to interlock same into a rigid lift frame pivotable upwardly and downwardly around said rear end mountings, hydraulic cylinder means pivotally connected at one lower end thereof to the lower portion of the front end of said tractor frame and at the other, upper end thereof to the lift frame adjacent the centers of the center legs of said C members for lifting and lowering the lift frame around the C member rear leg mountings thereof on the tractor frame, and bale grasping, releasing and tilting means pivotally mounted on said lift frame at the free ends of the front legs of the C members thereof.

4. A device as in claim 3 wherein the bale grasping, releasing and tilting means comprises, in combination, a pair of opposed frames each of substantial J configuration in side view pivotably mounted at their upper ends on the free ends of the forward legs of lift frame with the J frames opening inwardly with respect to one another, first hydraulic cylinder means interconnecting the J frames intermediate the ends thereof to form an assembly therewith and to move the frames toward and away from one another to grasp and release bales, and second hydraulic cylinder means connecting the J frame next to the tractor with the lift frame adjacent the forward free end thereof to tilt the J frame assembly with respect to the lift frame.

5. A device as in claim 3 wherein the hydraulic cylinder means are two in number, each one pivotally connected on the front end of the tractor frame under the center leg of one C member at the lower end thereof and at the other, upper end thereof to the substantial center portion of said center leg, said latter connection adjustable in position about said leg center portion.

6. A device as in claim 3 wherein the length of the rear legs of said C members are not substantially in excess of the height of said tractor body, whereby, when the C members are positioned with the center legs thereof in substantially horizontal position, the height of the lift frame is not substantially above the height of the tractor body.

* * * * *